United States Patent
Sumiyoshi et al.

(10) Patent No.: US 6,278,497 B1
(45) Date of Patent: Aug. 21, 2001

(54) MOVING PICTURE PROCESSING METHOD AND APPARATUS, AND COMPUTER PROGRAM PRODUCT HAVING PROCESSING PROCEDURE RECORDED THEREFORE

(75) Inventors: Masanori Sumiyoshi, Kodaira; Hirotada Ueda, Kokubunji; Takafumi Miyatake, Hachioji, all of (JP)

(73) Assignees: Hitachi, Ltd.; Hitashi Denshi Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/236,604

(22) Filed: Jan. 26, 1999

(30) Foreign Application Priority Data

Jan. 28, 1998 (JP) .................................................. 10-015459

(51) Int. Cl.[7] ............................ H04N 5/445; H04N 5/21; H04N 5/14; H04N 5/222; G11B 27/00
(52) U.S. Cl. ...................... 348/722; 348/722; 348/564; 348/616; 348/700; 386/52; 386/95; 386/77; 386/111; 345/327; 345/328; 345/341; 345/973; 345/348; 345/349
(58) Field of Search ................................ 345/328, 327, 345/341, 973, 348, 349, 357, 354, 339; 348/722, 564, 616, 700; 358/335; 386/52, 111, 95, 77

(56) References Cited

U.S. PATENT DOCUMENTS

| | | | |
|---|---|---|---|
| 4,667,221 | * | 5/1987 | Cawley et al. .......................... 358/22 |
| 5,259,040 | * | 11/1993 | Hanna ...................................... 382/41 |
| 5,448,315 | * | 9/1995 | Soohoo ................................. 348/722 |
| 5,488,433 | * | 1/1996 | Washino et al. ...................... 348/722 |
| 5,519,828 | * | 5/1996 | Rayner .................................. 395/161 |
| 5,532,833 | * | 7/1996 | Hong et al. ........................... 358/335 |
| 5,559,641 | * | 9/1996 | Kajimoto et al. .................... 360/14.1 |
| 5,760,767 | * | 6/1998 | Shore et al. .......................... 345/328 |
| 5,852,438 | * | 12/1998 | Tomaziwa et al. ................... 345/328 |
| 5,917,989 | * | 6/1999 | DuCatte, Jr. ........................... 386/52 |
| 5,949,953 | * | 9/1999 | Shirakawa .............................. 386/70 |
| 5,956,453 | * | 9/1999 | Yaegashi et al. ....................... 386/52 |
| 5,999,219 | * | 12/1999 | Boon .................................... 348/409 |
| 6,025,886 | * | 2/2000 | Koda .................................... 348/700 |
| 6,035,093 | * | 3/2000 | Kazami et al. ......................... 386/52 |
| 6,154,601 | * | 11/2000 | Yaegashi et al. ....................... 386/52 |
| 6,157,381 | * | 12/2000 | Bates et al. .......................... 345/341 |

* cited by examiner

Primary Examiner—Reinhard J. Eisenzopf
Assistant Examiner—Paulos M. Natnael
(74) Attorney, Agent, or Firm—Antonelli, Terry, Stout & Kraus, LLP

(57) ABSTRACT

A method and apparatus for processing a moving image displayed on a display unit. Images representative of sets of frame images forming said moving image to be processed are displayed on a display unit. The moving image includes a plurality of scene images. Each of said scene images is divided into a cut image which comprises a set of frame images, and each cut image is divided into a plurality of sub-areas. The representative frame images of said respective sub-area of the frame images are designated as representative images. Data of the representative images are linked to respective predetermined keys of an input device. In response to an operation of one of the keys, the representative image linked to the operated one of said keys is displayed on the display unit.

33 Claims, 9 Drawing Sheets

| FUNCTION / DISPLAYED POSITION | DISPLAY ONLY DURATION KEY PRESS 802 | KEY PRESS CAUSES DISPLAY CHANGE (REMAINS CHANGED) 803 | DISPLAY ONLY SELECTED M-ICON 804 |
|---|---|---|---|
| 800 POSITION BEING CURRENTLY DISPLAYED | ○ | ○ | ○ |
| 801 AS VERTICALLY ARRANGED (NOTE) | ○ | ✕ | ○ |

NOTE : HOWEVER, ONLY M-ICONS IN A ROW CAN BE SELECTED

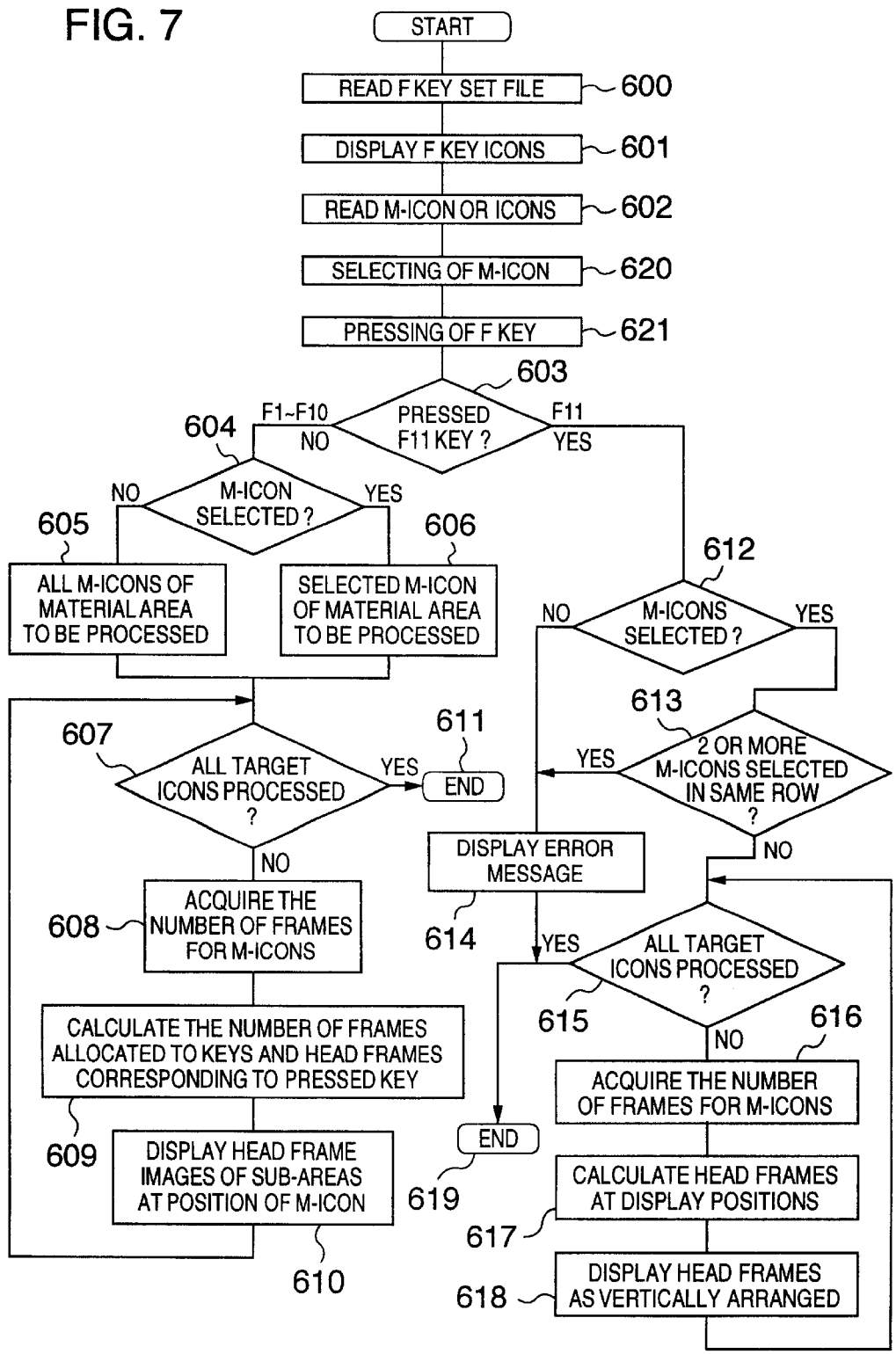

FIG. 8A

F1=10%
F2=10%
F3=10%
F4=10%
F5=10%
F6=10%
F7=10%
F8=10%
F9=10%
F10=REST (10%)

FIG. 8B

F1=5%
F2=5%
F3=5%
F4=5%
F5=30%
F6=10%
F7=10%
F8=10%
F9=10%
F10=REST (10%)

FIG. 9A

| F KEY | F1 | F2 | F3 | F4 | F5 | F6 | F7 | F8 | F9 | F10 |
|---|---|---|---|---|---|---|---|---|---|---|
| RATE | 10% | 10% | 10% | 10% | 10% | 10% | 10% | 10% | 10% | 10% |
| NUMBER OF FRAMES | 16 | 16 | 16 | 17 | 16 | 16 | 17 | 16 | 16 | 17 | n=163, p=10

FIG. 9B

| F KEY | F1 | F2 | F3 | F4 | F5 | F6 | F7 | F8 | F9 | F10 |
|---|---|---|---|---|---|---|---|---|---|---|
| RATE | 5% | 5% | 5% | 5% | 30% | 10% | 10% | 10% | 10% | 10% |
| NUMBER OF FRAMES | 8 | 8 | 8 | 8 | 49 | 16 | 17 | 16 | 16 | 17 | n=163, p=10

FIG. 9C

| F KEY | F1 | F2 | F3 | F4 | F5 | F6 | F7 | F8 | F9 | F10 |
|---|---|---|---|---|---|---|---|---|---|---|
| RATE | 10% | 10% | 10% | 10% | 10% | 10% | 10% | 10% | 10% | 10% |
| DISPLAYED FRAME | ① | ① | ② | ③ | ④ | ④ | ⑤ | ⑥ | ⑦ | ⑧ | n=8, p=10

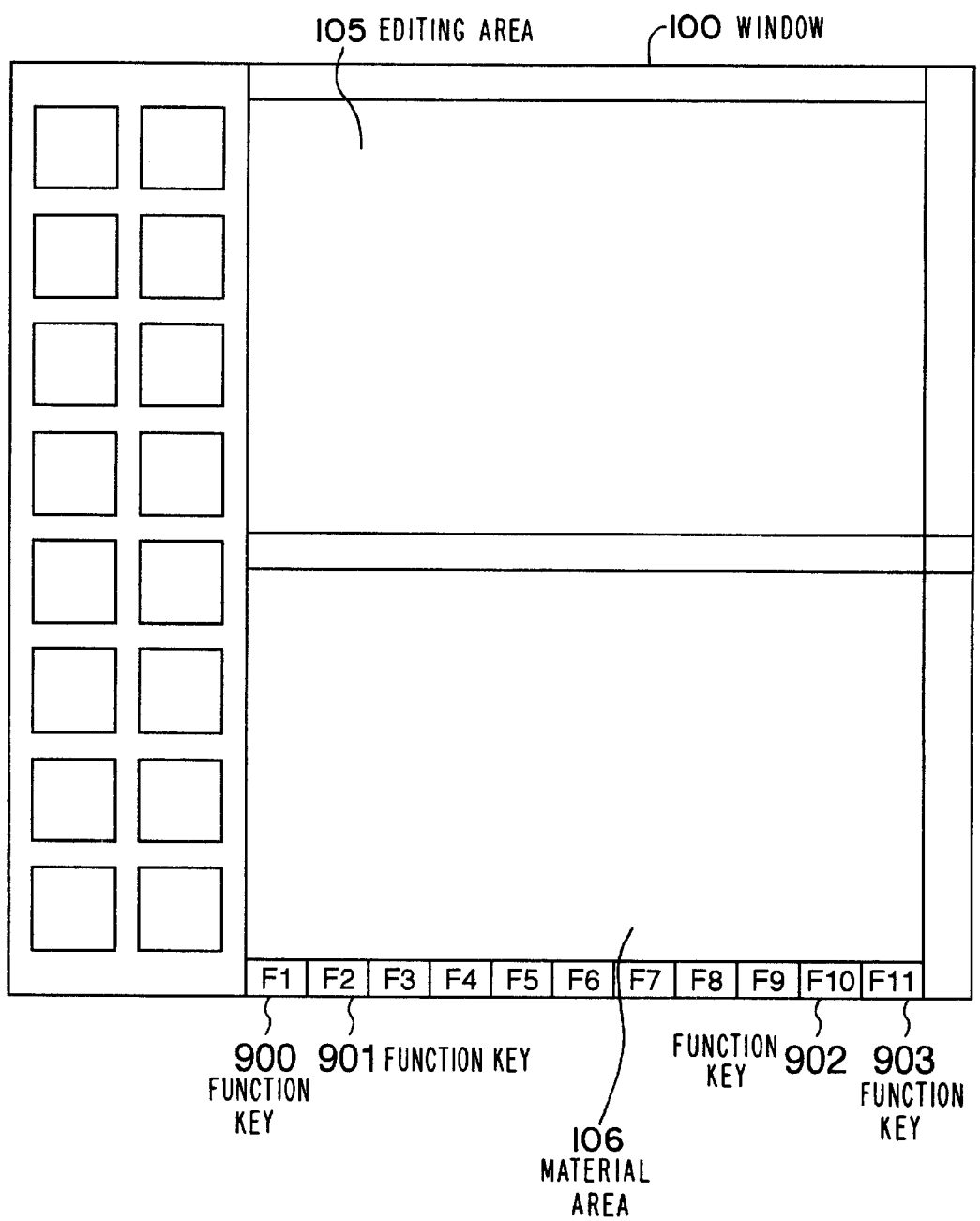

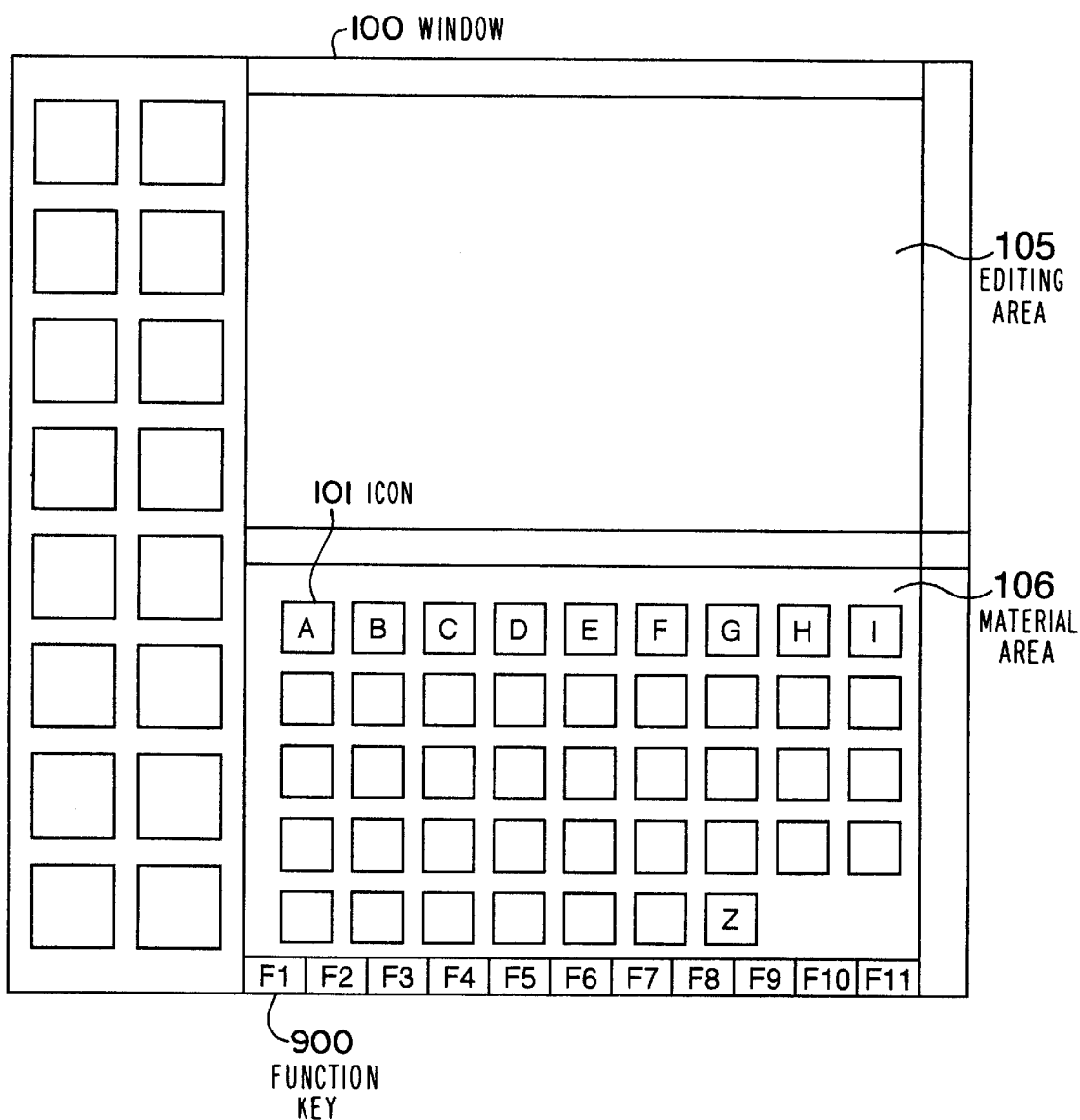

MOVING PICTURE PROCESSING METHOD AND APPARATUS, AND COMPUTER PROGRAM PRODUCT HAVING PROCESSING PROCEDURE RECORDED THEREFORE

CROSS-REFERENCES TO RELATED APPLICATIONS

The present invention relates to subject matters described in co-pending applications Ser. No. 08/826,975 now U.S. Pat. No. 5,956,453 filed on Apr. 9, 1997 and Ser. No. 09/140,351 filed on Aug. 26, 1998. The disclosures of these applications are incorporated herein by reference.

BACKGROUND OF THE INVENTION

The present invention relates to a moving picture processing apparatus for use in television broadcast program production, video program production or video editing, to a video processing method and apparatus which can be applied to a moving picture searching apparatus for search of a video source material library, etc. as well as to a computer program product having a video processing procedure recorded therein. More particularly, the present invention pertains to a computer-aided moving picture editing apparatus which can facilitate confirmation of contents of a moving picture source material during editing of the moving picture material and thus can shorten its editing time, by displaying an icon indicative of the picture material to be edited in a window on a display screen and operating the icon on the window.

As computers advance in processing speed and function, software has been quickly diversified and enhanced in their function. A facility for making a television broadcast program or a video program has also advanced in its function by applying such advance in computers and software to the facility.

In particular, editing of image information in making a program has been recently carried out with use of, e.g., a moving picture editing apparatus having a randomly-accessible information memory device using an inexpensive hard disk easy to handle and save. By employing such high-performance, diversified computer and software in the moving picture editing apparatus, the apparatus will be increasingly enhanced in its function.

FIG. 3 is a block diagram of an exemplary arrangement of a moving picture editing apparatus which embodies a moving picture editing method with the aid of a computer.

The illustrated moving picture editing apparatus includes a central processing unit (CPU) 301 for performing various sorts of control and editing operations on respective constituent devices of the moving picture editing apparatus under control of software programs; a display unit 308 for displaying control information on the CPU 301 as well as information on editing of motion images, scene images, cut images and a tree structure indicative of an editing status; an input device 309 for selecting information displayed on the screen of the display unit 308 and inputting a command to the CPU 301; a frame buffer memory 307 for storing therein picture information to be displayed on the display unit 308; and a picture reproducer (e.g., video tape recorder) 305 for reproducing a video signal for a moving picture for use in the editing and outputting the reproduced video signal to a video interface 304. The video interface 304 functions to convert the video signal of the moving picture received from the picture reproducer 305 into video information having such a format as able to be processed in the apparatus and to output the video information to an information memory device 306, a cut image change point detector 303 and a memory 302. The video interface 304 also functions to convert the picture information having such a format as able to be processed in the apparatus and received from the information memory device 306 into the video signal and to output the video signal from a video signal output terminal 311. The cut image change point detector 303 functions to judge that adjacent frame images of the moving picture belong to different cut images, by comparing the adjacent frame images and determining that an image information value indicative of a difference between the frame images exceeds a predetermined level. The memory 302 functions to store therein various sorts of software control programs for the CPU 301 and also to temporarily store various types of control information (such as a series of frame numbers of the moving picture, a frame number for the detected cut-image change point, a reduced image (M-icon) to be displayed on the screen of the display unit 308, successive numbers of cut images, a sequence of numbers indicative of an order of a plurality of cut images) to be used in the apparatus. The information memory device 306 of a random access memory type functions to store information about the editing moving picture which is reproduced by the picture reproducer 305 and which has the predetermined format converted by the video interface 304. The information memory device 306 also functions to store various editing and control information (such as M-icons) which are temporarily stored in the memory 302 to be used in the apparatus. The information memory device 306 uses, e.g., a hard disk of a random access memory type. The apparatus further includes a bus 310 for digital information transmission between the constituent elements of the moving picture editing apparatus. Although the various control programs of the CPU 301 have been explained in connection with a case where the programs are stored in the memory 302, the programs may be stored in a memory part (not shown) built in the CPU 301.

Connected to the bus 310 are the CPU 301, memory 302, cut image change point detector 303, video interface 304, information memory device 306 (e.g. a magnetic memory device), frame buffer memory 307, display unit 308, and input device 309 as the constituent elements of the moving picture editing apparatus. The CPU 301 transmits various types of signals between the constituent elements. These elements are controlled by an access signal issued from the CPU 301. An instruction to the CPU 301 is issued from such an input device 309 as a mouse or a keyboard.

When the moving picture editing apparatus is arranged as mentioned above and predetermined software programs are stored in the memory 302 (or the CPU 301), information on the moving picture to be edited can be stored in the memory 302 and information memory device 306 for its management. Further, when the moving picture stored in the memory 302 and information memory device 306 is displayed on the screen of the display unit 308 as cut images and scene images, and when these cut and scene images are used to form a tree structure; an operator can edit the moving picture.

A moving picture source material includes a plurality of sets of "cut" images. The cut image is defined as a set of a series of frame images taken in one shooting operation by a camera. Data on representative one of the frame images in each cut image is thinned out to form a reduced size image, which image will be referred to as M-icon. By operating the displayed M-icon on the display screen with use of a pointing device, the operator can carry out such editing operations as move, delete, couple, transform or special effect on the entire "cut" represented by the M-icon. One of methods of dividing a video source material into a plurality of cut images is, for example, to analyze features of such video data as illuminance, sound volume or color tone of a moving picture, to recognize as a cut boundary a remarkable change in these features and to automatically divide the moving picture into cut images sequentially at such recognized cut boundaries. This method is disclosed, e.g., in JP-A-2-184181 Publication.

A "scene" image includes a plurality of cut images. Further a plurality of scene images having a specific "shooting theme" form an editing moving picture. The editing moving picture is created by combining a tree structure having the cut images in a lower layer and the scene images with the "shooting theme" in an upper layer with M-icons of the video material.

FIG. 4 is an example of a display screen when a moving picture is edited with use of the moving picture editing apparatus of FIG. 3 using a moving picture editing application program.

The display screen has a window 100, which in turn includes an editing area 105 and a material area 106.

Displayed in the material area 106 as registered and arranged as editing materials are M-icons 101, 102, . . . and 104 which indicate as representative images the first frame images of cut images judged and divided at each cut image change point by the cut image change point detector 303. Although each M-icon is illustrated as a sheet of representative image for simplicity in the drawing, the M-icon is actually as illustrated 3-dimensionally on the display screen in the form of stacked sheets of frame provided with a thickness corresponding to the number of sheets.

Also displayed in the editing area 105 is a tree structure 107 of a combination of the M-icons of the edited moving picture. That is, M-icons edited and registered are displayed at a predetermined position in the tree structure 107.

Editing of the moving picture is carried out, for example, by placing a cursor or pointer on desired one of the M-icons 101, 102, . . . and 104 in the material area 106 with use of the mouse as the input device 309 to select the desired M-icon, and then dragging the desired M-icon to a desired position in the tree structure of the editing area 105 with the mouse button kept in its clicked state, thereby building up the M-icon as the typical cut image into a tree structure.

However, when the moving picture editing is carried out in this manner, in order to select desired one from the M-icons 101, 102, . . . and 104 in the material area 106 and drag it to the desired position in the tree structure 107 of the editing area 105 for its registration; the operator must confirm the contents of the selected editing material (desired M-icon). For example, the operator must examine the cut images for the M-icon from its beginning to end to confirm that the cut images have the same contents, e.g., all contain the same person or that the cut images contain different contents, e.g., person and scene are mixed.

Conventionally, in order to confirm the contents of the desired M-icon in this manner, the operator must open another preview window on the screen of the display unit 308, and actually preview the cut image data of the desired M-icon to confirm the contents of the cut images from its beginning to end, which requires a lot of time.

A moving picture is edited by selecting desired one from a plurality of M-icons displayed in a material area of a window, and then moving the desired M-icon to a desired position in a tree structure in an editing area to build up such M-icons into a tree structure. In this case, an editor or operator is required to confirm that image data of the selected M-icon have such contents as to meet operator's demand. However, a prior art moving picture editing method has had a problem that the method requires a lot of time to confirm the contents of the image data of the selected desired M-icon, because the operator must preview the image data contents from the beginning to the end in a normal reproduction speed or other reproduction speed close to the normal speed.

SUMMARY OF THE INVENTION

It is therefore an object of the present invention to provide a moving picture editing method. In the invention, n frame images (n being an integer of 2 or more) of representative image data of each M-icon are divided into p sub-areas (p is a natural number). Image data on respective head frame of the divided sub-areas are allocated to specific keys on the keyboard. An operator or editor can display the respective head frame of the allocated p-divided sub-areas on a display screen by pressing the allocated keys. The editor can grasp and confirm the contents of the image data of each M-icon in a short time by checking only the head images of the sub-areas.

In accordance with an aspect of the present invention, there is provided a method for processing a moving picture material with the help of a computer on the basis of an image displayed on a display unit with use of an input device. The method comprises the steps of displaying representative images representing cut images forming the moving picture material to be processed on the display unit; selecting at least one of the representative images displayed on the display unit; dividing a series of frame images of cuts for the selected representative image into a plurality of sub-areas; linking data of head ones of the frame images in the sub-areas to specific keys of the input device; and in response to an operation of one of the specific keys, displaying on the display unit ones of the head frames linked to the operated one of the specific keys.

In accordance with another aspect of the present invention, there is provided a moving picture processing apparatus which comprises an information memory device for storing therein image information and processing control information on a moving picture; the information being accessed in a random access manner; a display unit; a processor for accessing the information memory device and executing operations of writing/reading out the image information and processing control information of the moving picture in/from the information memory device, an operation of displaying the image and processing control information of the moving picture on the display unit, and an image processing operation according to a program; and an input device for inputting information to the processor and information memory device. The processor includes means for reading out representative images representing sets of frame images of the moving picture material to be processed from the information memory device and displaying the representative images on the display unit; means, when at least one of the representative images displayed on the display unit is selected with use of the input device, for dividing a series of frame images of cuts represented by the selected representative image into a plurality of sub-areas; means for storing therein a table showing a relationship between data of the head frame images of the sub-areas and specific keys of the input device allocated thereto; and means, when one of the specific keys is operated with use of the input device, for displaying the head frame images allocated to the operated key on the display unit.

In accordance with yet another aspect of the present invention, there is provided a computer program product in which the steps in the above moving picture processing method are described in the form of codes readable by a computer.

BRIEF DESCRIPTION OF THE DRAWINGS

FIG. 7 is a flowchart showing how to display the head images of the sub-areas in the embodiment of the moving picture editing method of the invention;

FIGS. 8A and 8B shows examples of set files for allocating the function keys to the sub-areas;

FIGS. 9A, 9B and 9C are tables showing a relationship between the function keys and frame positions of the head frames of the sub-areas to be displayed;

FIG. 10 is an example of an editing display screen showing icons of the function keys; and FIG. 11 shows M icons in addition to the screen of FIG. 10.

DESCRIPTION OF THE PREFERRED EMBODIMENTS

An embodiment of a moving picture editing method in accordance with the present invention will be explained with reference to FIGS. 1 to 6.

Figure 3:
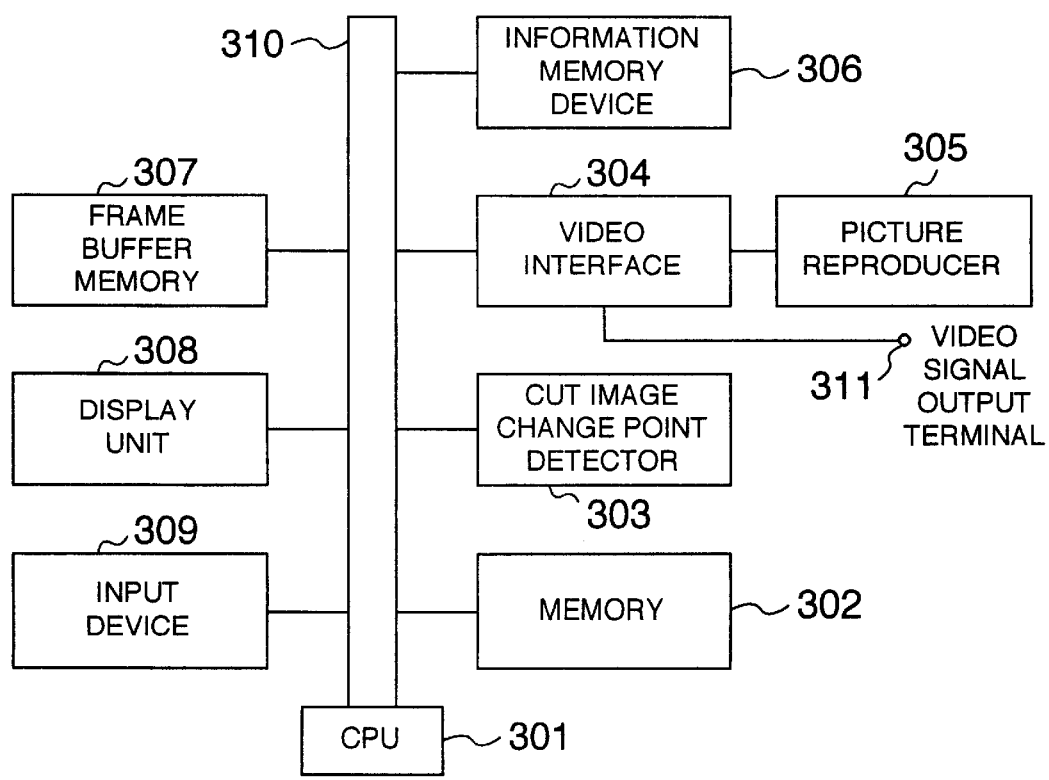
FIG. 3 is a block diagram of an example of a moving picture editing system to which the computer-aided moving picture editing method in accordance with the present invention can be applied.

A basic structure of a moving picture editing apparatus which embodies a moving picture editing method in accordance with an embodiment of the present invention is similar to the structure shown in FIG. 3.

The illustrated apparatus includes a central processing unit (CPU) 301 for performing various sorts of control and editing operations on respective constituent devices of the moving picture editing apparatus under control of predetermined software programs; a display unit 308 for displaying control information on the CPU 301 as well as information on editing of motion images, scene images, cut images and a tree structure indicative of an editing status; an input device 309 such as a mouse or keyboard for selecting various sorts of information displayed on the screen of the display unit 308 and inputting a command to the CPU 301; a frame buffer memory 307 for storing therein picture information to be displayed on the display unit 308; and a picture reproducer (e.g., video tape recorder) 305 for reproducing video and voice signals for a moving picture for use in the editing and outputting the reproduced video signal.

The apparatus also includes a video interface 304 for converting the video signal of the moving picture received from the picture reproducer 305 into video information having such a format as able to be processed in the apparatus or for converting the picture information having such a format as able to be processed in the apparatus into the video signal and for outputting the video information or signal from a video signal output terminal 311; and a cut image change point detector 303 for judging that adjacent frame images of a moving picture belong to different cut images when comparing the adjacent frame images and determining that an image information value indicative of a difference between the frame images exceeds a predetermined level. The apparatus further includes a memory 302 for storing therein various sorts of software control programs for the CPU 301 and also temporarily storing various types of control information (such as a series of frame numbers of the moving picture, a frame number for the detected cut-image change point, a reduced image (M-icon) corresponding to a reduction of an input picture (having a size of, e.g., 640×480 pixels) to such a size (e.g., 80×60 pixels) as able to be displayed on the screen of the display unit 308, successive numbers of cut images, a sequence of numbers indicative of an order of a plurality of cut images) to be used in the moving picture editing apparatus; and an information memory device 306 of a random access memory type for storing information on the editing moving picture reproduced by the picture reproducer 305 and having the predetermined format converted by the video interface 304. The information memory device 306 also functions to store various editing and control information, e.g., image data such as M-icons which are temporarily stored in the memory 302 to be used in the apparatus. Also included in the apparatus is a bus 310 connected between the CPU 301, memory 302, cut image change point detector 303, video interface 304, information memory device 306, frame buffer memory 307, display unit 308 and input device 309 for digital information transmission therebetween. The information memory device 306 uses such a recording medium as a hard disk, optical disk or magneto-optic disk.

The respective elements connected to the bus 310 are controlled by an access signal issued from the CPU 301.

Further, the information memory device 306 may be used in the form of a remote file via a communication network.

When a software program describing a procedure of the moving picture editing method of the invention is previously stored in the memory 302 and the memory 302 is used in the moving picture editing apparatus arranged as mentioned above; a moving picture to be edited can be managed as stored in the information memory device 306. Thus the editor can prepare a program of a series of edited pictures, by displaying the moving picture stored as managed in the information memory device 306 in an editing window on the screen of the display unit 308 in the form of cut or scene images arranged as a tree structure, and then by editing the images on a cut or scene basis.

The operation of a computer-aided moving picture editing apparatus as well as a method for editing a moving picture with use of M-icons and a tree structure are already described in detail in, e.g., Co-pending patent application Ser. No. 08/826,975 filed on Apr. 9, 1997. The present application incorporates contents disclosed in this co-pending Patent Application for reference.

The term "cut image" as used herein is generally defined as a set of frame images shot by a camera during a single filming or shooting from its beginning to end. With the moving picture editing apparatus of the present invention, each of the M-icons appearing on the screen of the display unit 308 forms a user interface with a set of cut images during one "shooting" in a 1:1 relation.

Further, the term "scene image" is defined as a set of cut images having a predetermined shot object. A plurality of scene images are combined together along a specific shooting theme thereby to form a program (a gathering of scene images).

In this way, the moving picture edited as a single program can be displayed and re-arranged on the display screen as a tree structure including a plurality of cut images, scene images corresponding to sets of cut images, and a series of moving pictures (program) corresponding to sets of scene images having a shooting theme.

An example of how to edit a moving picture in accordance with the present invention will be explained below.

The control programs for editing a moving image have been stored in the memory 302 in the present embodiment, but the programs may be stored in a memory other than the memory 302, for example, in a memory built in the CPU 301.

At the time of editing a moving picture, the picture reproducer 305 such as a video tape recorder is first operated to reproduce a moving picture (signal) stored in a memory medium, e.g., in video tape. The reproduced picture data is converted by the video interface 304 to picture information having a predetermined format. The converted picture information is transmitted via the bus 310 to the information memory device 306 to be stored therein.

The moving picture stored in the information memory device 306 is used for its editing. The moving picture is stored in the memory device 306 in the form of a predetermined number of cut images which correspond to image materials of a program to be edited.

When the contents of image materials of the program to be edited are displayed on the screen of the display unit 308, the editor can select the image materials highly easily.

Figure 4:
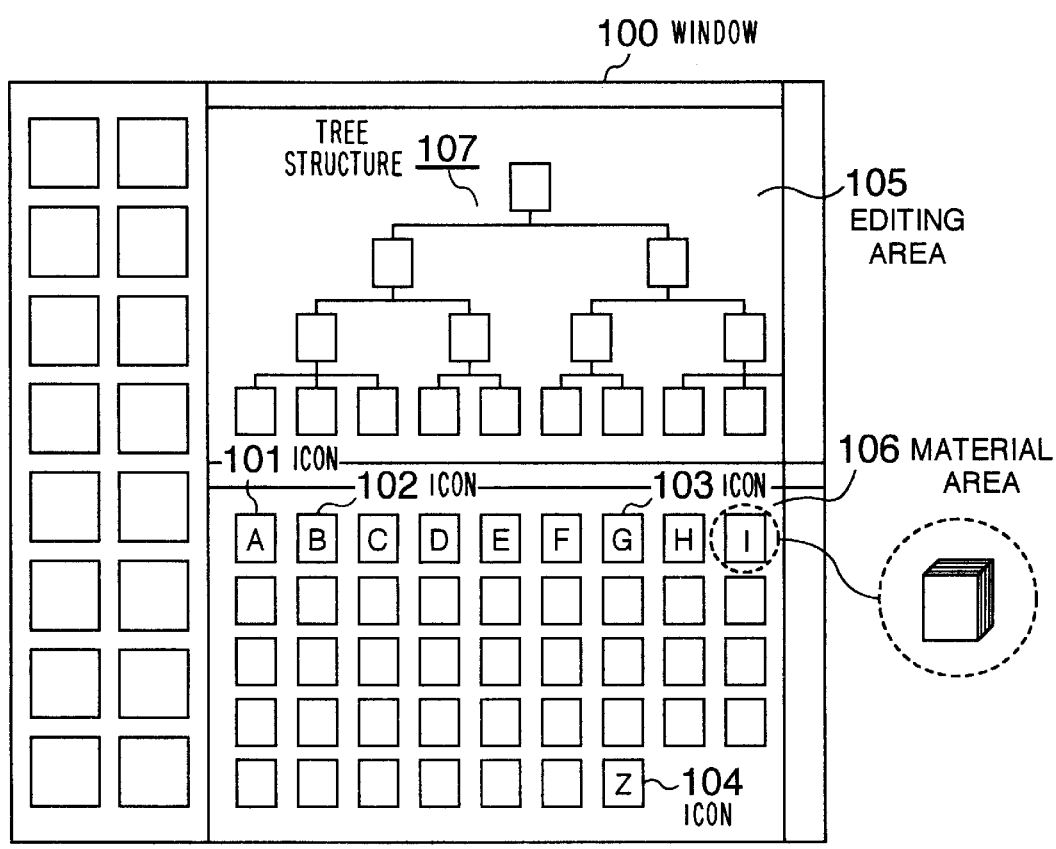
FIG. 4 shows an example of a full editing screen of a display unit when the moving picture editing method of the invention is used.

FIG. 4 shows a screen of the display unit 308 of he moving picture editing apparatus embodying the moving picture editing method of the invention, having an editing window 100.

The window 100 has a material area 106 in which image materials are displayed in the form of M-icons, and has an editing area 105 in which a scene image consisting of a plurality of cut images as well as a moving picture consisting of a plurality of scene images to be edited according to one theme are displayed in the form of a tree structure 107.

In this case, when the editor reads out the image information stored in the information memory device 306 therefrom with use of the input device 309, e.g., the mouse (which image information is read out through window screen operations but explanation thereof is omitted); this causes appearance of typical ones of the cut images detected by the cut image change point detector 303 and divided at change points therein in the material area 106 as M-icons 101 to 104. The image data of these M-icons are temporarily stored in the memory 302.

More specifically, the M-icons 101 to 104 indicate the first ones of frame images in the cut images as their representative images. Each of the cut images for the M-icons 101 to 104 is usually made of a plurality of frame images.

Figure 2:
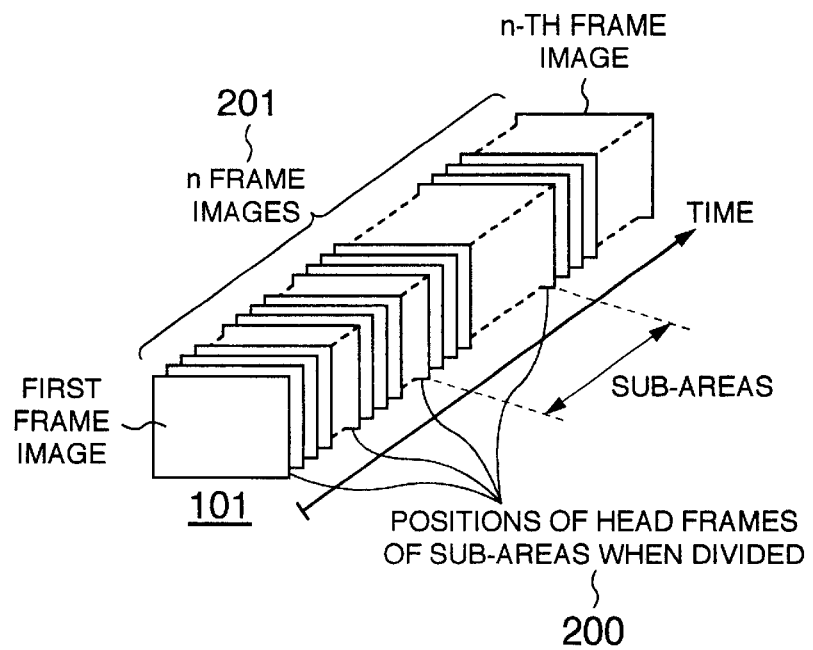
FIG. 2 shows schematically a structure of frame images contained in cut images represented by an M-icon.

FIG. 2 is a perspective view of an exemplary structure of a plurality of frame images for one of the Micons for its explanation.

In FIG. 2, for example, the image data of the M-icon 101 on the display screen of FIG. 1 is perspectively illustrated. It goes without saying that the same explanation holds true even for the M-icons 102 to 104.

With respect to the M-icon 101, the first one of the frame images is illustrated on the display screen of FIG. 1 as its representative image. However, since the icon is actually made up of n frame images 201 (n being a positive integer) as shown in FIG. 2, it is necessary, when using the M-icon 101 during its editing, for the editor to confirm the contents of the n frame images 201 on the screen of the display unit 308 to check whether or not the n frame images 201 are necessary or are all desired images.

In the moving picture editing method of the invention, the n frame images 201 corresponding to the M-icon 101 are divided into p sub-areas (where p is a natural number). Image data of head ones of frame images 200 of the p sub-areas are allocated to a predetermined number of keys on the keyboard as the input device 309. Since pressing of one of the image-data allocated keys of the keyboard causes the image data of the corresponding frame image to appear on the screen of the display unit 308, the editor can easily confirm the image data of the M-icon 101 quickly.

Figure 1A:
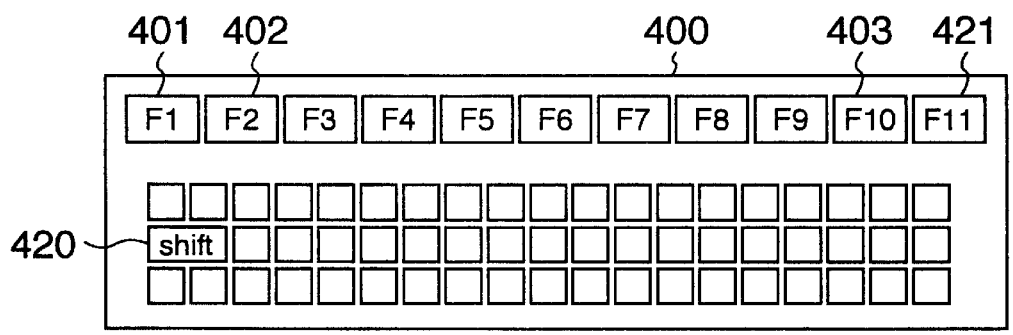
FIG. 1A is an exemplary top appearance of a keyboard used in a moving picture editing apparatus in accordance with the present invention.

FIG. 1A shows a key array of a keyboard 400 as the input device 309 usable in the moving picture editing apparatus in accordance with an embodiment of the present invention. The keyboard usable in the present invention is not limited to such a keyboard as shown in FIG. 1A but a standard keyboard usable in a personal computer may be employed. For example, the 106 type Japanese keyboard, the 101 type English-character keyboard, etc. may be used. Further, the same function as the keyboard can be realized with a pointing device, in which case an operator operates key icons of a keyboard displayed on a display screen with use of the pointing device. In addition, an input device having a similar function to keyboard keys may be employed.

The invention will be detailed in connection with FIG. 1B explaining how to display the image data of the M-icons in the moving picture editing method of the invention.

Assume now that the cut image corresponding to the target M-icon 101 consists of, e.g., 100 frame images 201 (when n is 100) and the number of divisions (i.e., the number of allocated keys) p is 10. That is, a cut is divided into ten sub-areas. Then head ones of frame image groups 200 each having 100 frame images are numbered by 1, 11, 21, . . . , 81 and 91.

The image data of the 10 head frames 200 are allocated to, e.g., function keys (which will be referred to as F keys, hereinafter) 401 to 403 of the keyboard 400 (shown in FIG. 1) as the input device.

That is, the image data of the first frame image is allocated to a F1 key 401, the image data of the 11-th frame image is to a F2 key 402, and so on. And finally the image data of the 91-st frame image is to a F10 key 403.

Accordingly, pressing of the F1 key 401 causes an image on the image data of the first frame image to appear on the screen of the display unit 308; while pressing of the F2 key 402 causes an image on the image data of the 11-th frame image to appear on the display 308.

Figure 1B:
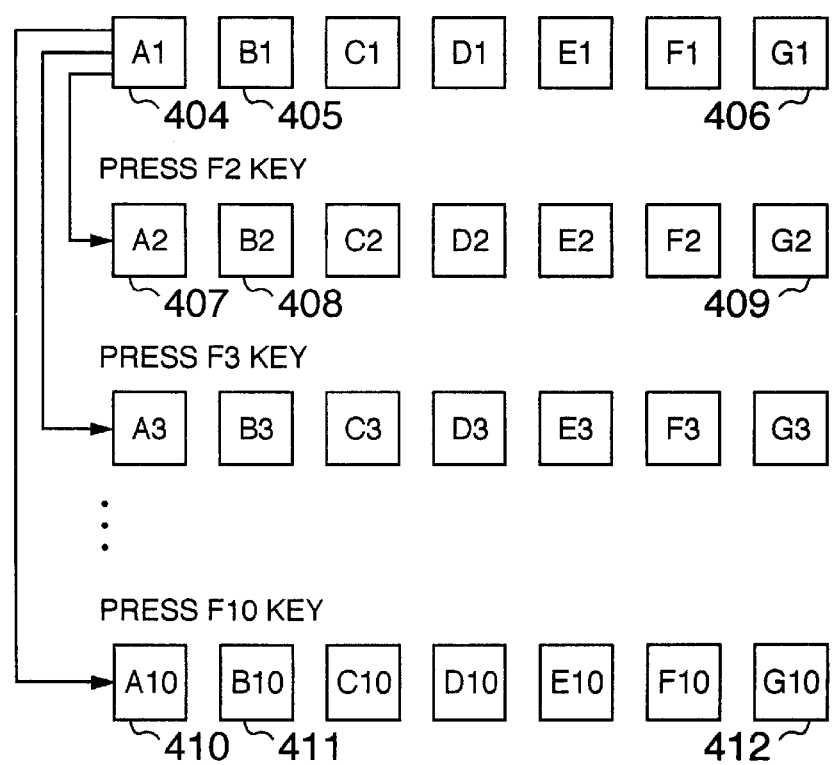
FIG. 1B is a diagram for explaining a relationship between function keys and head images of sub-areas.

A plurality of blocks A to G shown in FIG. 1B indicate representative frame images corresponding to the selected M-icons A (101) to G (103) shown in FIG. 4.

More in detail, cut images of frame images represented by the first M-icon A (101) in the material area 106 of FIG. 4 are divided into 10 (p=10) sub-areas. Head ones of the frame images in the sub-areas correspond to images A1 (404), A2 (407), . . . and A10 (410) in FIG. 1B. Similarly, cut images of frame images represented by the second M-icon B (102) in FIG. 4 are divided into 10 (p=10) sub-areas. Head ones of the frame images in the sub-areas correspond to images B1 (405), B2 (408), . . . and B10 (411) in FIG. 1B. Further, cut images of frame images represented by the seventh M-icon G (103) in FIG. 4 are divided into 10 (p=10) sub-areas. Head ones of the frame images in the sub-areas correspond to images G1 (406), G2 (409), . . . and G10 (412) in FIG. 1B. The same explanation holds true even for the other selected M-icons C, D, E and F.

Allocated to the F1 key of the keyboard 400 are the first frame images A1 (401), B1 (405), C1, D1, E1, F1 and G1 (406) of the first sub-area. Allocated to the F2 key are the first frame images A2 (407), B2 (408), C2, D2, E2, F2 and G2 (409) of the second sub-area. Similarly allocated to the F10 key are the first frame images A10 (410), V10 (411), C10, D10, E10, F10 and G10 (412) of the tenth sub-area.

According to the above key allocation, when the editor presses the F1 key, this causes appearance the first frame images of the first sub-area of any of the frame images A1 (401), B1 (405), C1, D1, E1, F1 and G1 (406). For example, when the editor specifies the M-icon A (101) in the material area 106 of FIG. 4 and then presses the F1 key 401, this causes appearance of the first frame image A1 (401) of the first sub-area. When the editor specifies the M-icon B (102) in the material area 106 of FIG. 4 and then presses the F2 key 402, this causes appearance of the first frame image B2 (408) of the second sub-area. In this way, when the editor specifies the M-icons 101, 102, 103 and 104 represented as typical cut images and then presses the function keys 401, 402 and 403; this causes the frame images of the specified cut images allocated to the function keys to be read out from the memory 302 and then displayed.

Further, when no M-icon is selected in the material area 106 shown in FIG. 4, a change-over of display for all of the M-icons existing on the material area is executed.

The M-icon indicative of the cut image initially read out from the information memory device 306 is usually designed to display the first frame image. In this initial state, a particular M-icon has not been selected.

In other words, the display of the M-icon A (101) (refer to FIG. 1) means the display of the image A1 (404) (refer to FIG. 4); and the display of the M-icon B (102) eans the display of the image B1 (405).

Accordingly, when the F2 key 402 is pressed, the display of the M-icon A (101) means the display of the image A2 (407) and the display of the M-icon B (102) means the display of the image B2 (408). Similarly, when the F10 key is pressed, the display of the M-icon A (101) means the display of the image A10 (410) and the display of the M-icon B (102) means the display of the image B10 (411).

Explanation will next be made as to display positions of head ones of the frame images in the sub-areas of the M-icons and how to display the positions.

Figures 5, 6:
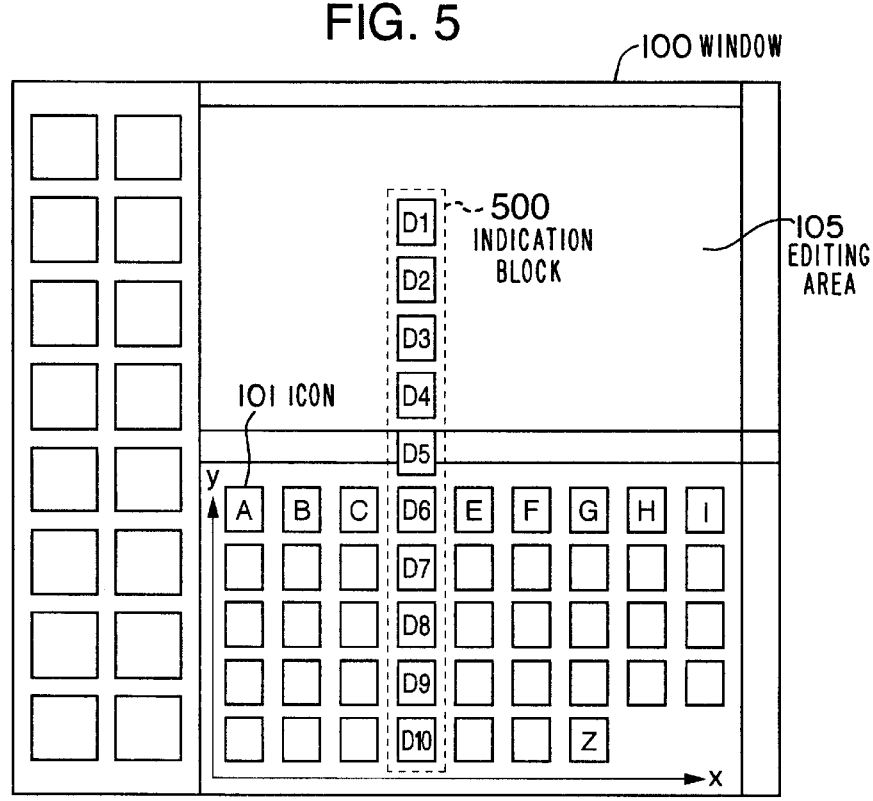
FIG. 5 shows exemplary head images of sub-areas in accordance with an embodiment of the moving picture editing method of the invention.
FIG. 6 is a list of several display modes in the embodiment of the moving picture editing method of the invention.

Combinations of the display positions of head frame images of the sub-areas and how to display the positions are shown by such a table as shown in FIG. 6.

First of all, explanation will be directed to the display positions of the frame images.

There are two methods of displaying the positions of the head frame images of the sub-areas, i.e., a method 800 of displaying the positions of the head frame images are rearranged and displayed at the same positions as those of the frame images being now displayed and a method 801 of displaying the positions of the head frame images at such positions as vertically arranged.

In the mode 800 in which the positions of the head frame images at the same positions as those of the frame images being now displayed are displayed; the frame image corresponding to the depressed function key is displayed as to overwrite to the M-icon being now displayed. The corresponding frame images entered usually based on the F keys are displayed in this mode.

The method 801 of displaying the head frame images as vertically arranged is shown in FIG. 5, in which mode the respective head frame images allocated to the F functions are displayed as an indication block 500 of their icons vertically arranged.

In the indication block 500 of the icons vertically arranged, the function of displaying the head frame images of all the sub-areas for a specified M-icon cut is previously allocated, for example, to the F11 key 421, so that pressing of the F11 key 421 enables display of the head frame images.

In this display case, (any or all of) one column of M-icons in the material area 106 are to be displayed.

For example, when one column of M-icons are selected, this is effective when it is desired to compare the contents of the arranged in lateral direction M-icons.

Explanation will then be made as to how to display the respective frame images allocated, e.g., to the F keys of the keyboard according to the operational states of the F keys.

A method of displaying the head frame images is classified into two modes, that is, a mode 802 for displaying the frame images allocated to the F key only when the F key is pressed, and a mode 803 for displaying the contents of the frame images allocated to the F key as switched (as to remain switched).

Change-over between the two modes is judged, for example, by whether the F key was pressed simultaneously with pressing of a SHIFT key 420 of the keyboard 400 or only the F key was pressed. For example, in FIG. 4, an operator selects M-icon 102 in the material area 106 and presses F2 key and SHIFT key 420 at a same time, when the process proceeds to step 611, the reduced image of M-icon 102 becomes "B2" and the image is kept as it. If the operator wants to turn back this changed reduced frame image to the previous representative image, he or she operates the steps shown in FIG. 7 for any one of F keys without pressing of SHIFT key 420.

Explanation will next be made as to a mode 804 for selection of an M-icon to be display-switched. In the material area 106 (see FIG. 1), one of the M-icons which contents the editor wants to confirm is selected with use of the mouse as the input device 309.

The selected M-icon is clearly indicated as surrounded by a color (such as red) frame.

With the selected M-icon highlighted by the red frame, pressing of a predetermined F key having frame images allocated thereto causes only the selected M-icon to be display-changed. In this connection, the invention also has a function of selecting all the M-icons at a time.

The above M-icons 101, 102, 103 and 104 displayed in the material area 106 and editing area 105 correspond each to a reduction (e.g., 80×60 pixels) of the image sizes (e.g., 640×480 pixels) of the original moving picture stored in the information memory device 306. The size-reduced image is stored in the memory 302 during editing. However when the reduced image was deleted from the material area 106 and editing area 105 or when the editing of the moving image is completed, the image is eliminated from the memory 302. In this connection, necessary information of editing control information stored in the memory 302 is stored in the information memory device 306 each time the operator gives an instruction.

During the editing operation, since the M-icon is read out directly from the memory 302, access can be made faster than when the image stored in the information memory device 306 is read out therefrom and displayed or when the compressed image is read out and displayed as expanded.

Further, the use of the function of confirming the contents of the frame images with use of the above keyboard 400 enables the operator to confirm the contents of image data of M-icons stored in the memory 302 in a short time, resulting in reduction of a time necessary for editing works.

Although the n frame images have been divided into 10 divisions in the foregoing explanation, it goes without saying that the division number is not limited to 10 and it is also unnecessary to divide the frame images equally.

Further, the respective frame images may be allocated not only to the F keys but also to numeric keys or alphabetic keys, as a matter of course. For example, in a case of eight dividing number, n frames of images are divided into eight sub-areas.

The operation of the moving picture editing method in accordance with an embodiment of the present invention will be detailed by referring to a flowchart of FIG. 7 and FIGS. 8A, 8B and 3. When the apparatus of Fig. 3 is started, a function key set file is read out from the information memory device 306 at a step 600. The set file is a table for specification of a rate of a sub-area length to a cut length when cuts represented by a typical M-icon are divided into a plurality of sub-areas. The table is previously prepared and registered in the information memory device 306 by the editor with use of the input device 309. Based on the set file, the head frame images of sub-areas can be allocated to the respective function keys. Examples of the set file are as shown by tables in FIGS. 8A and 8B.

In the case of FIG. 8A, a value 10% is equally set for all the function keys from the F1 key 701 to F9 key 702. The rest rate is set for the F10 key. In other words, the cuts are equally divided by 10% of the full length (number of frames) of the cuts into sub-areas, and the F1 to F10 keys are allocated to the head frame images of the divided sub-areas. Explanation will be made more in detail in connection with FIG. 9A. In the case of this example, it is assumed that the number of all frames in the cuts is 163. Ten % of 163 is 16.3, and thus the head frame images of sub-areas each having a length of 16 frames are allocated to the F1 to F3 keys. The last frame of the sub-area allocated to the F3 key corresponds to the 48-th frame when counted from the head frame of the cuts, and the last frame of the sub-area allocated to the F4 key corresponds to the 65-th frame (163×40%=65.2) when counted from the beginning. Thus the sub-area allocated to the F4 key has a length of 17 frames. With respect to the other function keys, a similar procedure to the above is used to allocate the divided sub-areas to the function keys. With regard to the F10 key, the remainder of the sub-areas allocated to the F1 key 701 to F9 key 702 is allocated to the F10 key.

In the case of the set file of FIG. 9A, pressing of the F1 key causes the first frame image of the cuts, i.e., an M-icon representing a typical cut image to appear; pressing of the F2 key causes the 17-th frame image when counted from the beginning to appear; and pressing of the F4 key causes the 49-th frame image to appear. Other examples of the set file are shown in FIGS. 8B, 9B and 9C, which will be explained later.

Returning to the flowchart of FIG. 7, next, icons 900 to 903 indicative of key images of the keyboard 400 are displayed in the underside of the material area 106 window of the material area 106 at a step 601. In this example, the key icons are shown in the form of F1 to F11 keys. When the editor operates the key icons 900 to 903 on the display screen with use of a pointing device (not shown), the key icons can have the same function as those of the keyboard 400. When the hardware keyboard 400 is employed as the input device, the step 601 is bypassed.

Next, when the operator (or editor) selects a M-icon to be changed the displaying of the image at a step 620. (If any M-icon is not selected, the operation is conducted for all of the M-icons as the subjects.) At the next step 603, the type of the pressed function key is detected. When the operator presses any one of the function keys of F1 to F10, it is detected whether a particular M-icon has been specified or not. At a next step 603, the operator presses one of the function keys to specify one of the sub-areas to be displayed. When the operator presses any one of the function keys of F1 to F10, he further specifies at a step 604 one of the cut M-icons in the material area 106 of FIG. 11, which contents he wants to confirm. When the operator presses the F11 key at the step 603, this causes control to move to a step 612, which will be explained later.

If the operator has not selected any of the M-icons, then this causes setting of the cut sub-areas of all the M-icons in the material area 106 as the to-be-displayed areas at a step 605. When the operator has selected specific one or ones of the M-icons, this causes only the selected M-icon or icons to be displayed on the screen at a step 606. Next, it is judged at a step 607 whether or not all the M-icons to be processed have been processed. At a step 608, the number n of all cut frames for the M-icons to be processed is input. At a step 609, the number of frames for the sub-areas is calculated based on allocation numeric values for the function keys and looking up the set file of FIGS. 8A and 9A (or FIGS. 8B, 9B and 9C), and image data of the head frames of the sub-areas corresponding to the pressed function key stored in the memory 302 is displayed at a corresponding M-icon position. The operations of the steps 607 to 610 are repeated until the M-icons to be processed are all processed, at which stage the operation is finished at a step 611.

Next, when the operator has pressed the F11 key, processing proceeds at the step 603 in such a manner as to display head frame images D1 to D10 in all sub-areas belonging to the selected M-icon as vertically arranged. In this case, it is impossible to select a plurality of M-icons in an identical vertical row in the material area 106 of the display screen. only one of the M-icons in a vertical row can be selected. It is only when M-icons are in different rows that a plurality of M-icons can be selected.

At a next step 612, it is judged whether or not the operator selected a specific M-icon or icons. No selection of any M-icon causes an error message to appear at a step 614, and the system goes to a step 619 to get ready for a next input. When two or more M-icons in an identical row in the material area 106 of the display screen are specified at a step 613, the system issues the error message at a step 614. At a step 615, the system judges whether or not all the M-icons to be processed were processed. At a step 616, the system inputs the number n of all frames for the selected M-icons. At a net step 617, the system calculates the number of frames for the sub-areas, looking up the set file of FIGS. 8A and 9A (or of FIG. 8B, or FIGS. 9B and 9C) according to the allocation numeric values of the function keys. At step 618, the image data of head frames of sub-areas corresponding to the pressed function key displays the 10 head frame images D10 to D1 in the material area 106 toward a y coordinate direction from the Y coordinate position of the head frame image D10 as its reference. The operation of the steps 615 to 618 are repeated until the processing of the M-icons to be processed are all completed, at which time the system terminates its operation at a step 619.

Explanation will next be made as to other examples of the set file. In the case of FIG. 8B, a value of 5% is equally allocated to the function keys of F1 to F4, but a value of 30% is allocated to the F5 function key, a value of 10% is equally allocated to the F5 to F9 function keys, and the remainder or balance rate is allocated to the F10 function key. Based on the set file of FIG. 8B, correspondences between the number of frames and function keys are made as shown in FIG. 9B. In this example, the total number of all cut frames is set at 163. Five % of 163 is 8.15 and thus the head frame images of sub-areas each having a length of 8 frames are allocated to the F1 to F4 function keys. The head frame image (the 33-rd frame when counted from the beginning) of 49 frames of the sub-area is allocated to the F5 function key. Pressing of the F1 function key causes the first frame image of a cut, i.e., the M-icon representative of the cut to be displayed; pressing of the F2 key causes the ninth frame image (when counted from the beginning) to be displayed, and pressing of the F5 key causes the 33-rd frame image (when counted from the beginning) to be displayed. With respect to the other function keys, the numbers of frames are allocated thereto basically based on the same calculation as in FIG. 9A.

Next, FIG. 9C shows another example of the set file when a value of 10% is equally allocated to all the function keys as in the set file of FIG. 8A. However, this example is different from the example of FIG. 8A, in that the number n of all frames is set to be larger than the division number p. In the case of FIG. 9C, n is 8 and p is at 10. Numbers in a display frame column of the table of FIG. 9C indicate the sequential numbers of frames to be displayed on the display screen (when counted from the respective head frames of the cuts). In this case, the first frame image always is related to the F1 key. Since 20% of the number of frames are allocated to the F1 and F2 keys in total, 8×20%=1.6. Hence only the first frame can be allocated to the F2 key, so that pressing of the F1 or F2 key causes appearance of the first frame image in either case. Since 30% of the number of frames are allocated to the F1 to F3 keys in total, 8×30%=2.4. Thus pressing of the F3 key causes appearance of the second frame image. With respect to even the other function keys, such allocation of the function keys and display frame images as shown in FIG. 9C is carried out based on a similar calculation to the above. Such indication is the same even when division rate values allocated to the keys are very small.

A program for executing such flowchart operation as shown in FIG. 7 has a code format readable by a computer and is stored in a recording medium. Usable as such a recording medium is, for example, a CD-ROM, magnetic disk, magneto-optic disk or semiconductor memory. The recording medium can be used as the memory 302.

In accordance with the present invention, there is provided a moving picture editing method by which image data of n frame images of M-icons each having a length of n frames are divided into p areas, the image data of head frame images of the divided p areas are allocated to predetermined keys of a keyboard, so that pressing of the predetermined keys causes the head frame images of the allocated p areas to be displayed on a display unit, and an operator can grasp and confirm the contents of the image data of the M-icons in a short time.

What is claimed is:

1. A method for processing a moving image displayed on a display unit, comprising the steps of:

displaying images representative of sets of frame images forming said moving image to be processed on said display unit, said moving image comprising a plurality of scene images;

dividing each of said scene images into cut images each of which comprises a set of frame images, and dividing each cut image into a plurality of sub-areas;

designating representative frame images of respective sub-areas of the sets of frame images as representative images;

linking data of said representative images to respective predetermined keys of an input device; and in response to an operation of one of said keys, displaying on said display unit a representative image linked to the operated one of said keys, wherein, in said dividing step, numeric values indicative of ratios of the number of frames of the sub-areas to the number of all frames of said cut images are specified.

2. A method as set forth in claim 1, wherein each of said representative frame images is a head frame image of one of said sets of frame images, and wherein said head frame image is displayed on said display unit in the order of said cut images produced from said scene images.

3. A method as set forth in claim 1, wherein said keys are provided as icons indicative of a keyboard displayed on a screen of said display unit.

4. A method as set forth in claim 1, wherein an editing area and a video material area are provided on the screen of said display unit, said representative images of the sets of frame images of the moving picture material are displayed in said video material area, the edited moving picture is displayed in the form of a tree structure having the representative images selected from said video material area and arranged in said editing area, so that, when an operator specifies one of said representative images with use of said input device and operates one of the specific keys, the head frame images of sub-areas for the designated representative image are displayed as overlapped with the designated representative images in said video material area.

5. A method as set forth in claim 1, wherein each of said representative frame images is a head frame image of one of said sets of frame images, and wherein head frame images are displayed only during the operation of a specific key.

6. A method as set forth in claim 1, wherein each of said representative frame images is a head frame image of one of said sets of frame images, and wherein, after the operation of a specific key, head frame images are successively displayed.

7. An apparatus for processing a moving image displayed on a display unit, comprising:

means for displaying images representative of sets of frame images forming said moving image to be processed on said display unit, said moving image comprising a plurality of scene images;

means for dividing each of said scene images into cut images each of which comprises a set of frame images, and dividing each cut image into a plurality of sub-areas;

means for designating representative frame images of respective sub-areas of the sets of frame images as representative images;

means for linking data of said representative images to respective predetermined keys of an input device; and means, in response to an operation of one of said keys, for displaying on said display unit a representative image linked to the operated one of said keys, wherein, in said dividing means, numeric values indicative of ratios of the number of frames of the designated representative frame images to the number of all frames of said cut images are specified.

8. An apparatus as set forth in claim 7, wherein each of said representative frame images is a head frame image of one of said set of the frame image, and wherein said head frame image is displayed on said display unit in the order of said cut images produced from said scene images.

9. An apparatus as set forth in claim 7, wherein said keys are provided as icons indicative of a keyboard displayed on a screen of said display unit.

10. An apparatus as set forth in claim 7, wherein an editing area and a video material area are provided on the screen of said display unit, said representative images of the sets of frame images of the moving picture material are displayed in said video material area, the edited moving picture is displayed in the form of a tree structure having the representative images selected from said video material area and arranged in said editing area, so that, when an operator specifies one of said representative images with use of an input device and operates one of the specific keys, the head frame images for the designated representative image are displayed as overlapped with the specified representative images in said video material area.

11. An apparatus as set forth in claim 7, wherein each of said representative frame images is a head frame image of one of said sets of frame images, and wherein, in response to a specific key operation, one of head frame images of frame images of said designated representative image is displayed.

12. An apparatus as set forth in claim 7, wherein each of said representative frame images is a head frame image of one of said sets of frame images, and wherein head frame images are displayed only during the operation of a specific key.

13. An apparatus as set forth in claim 7, wherein each of said representative frame images is a head frame image of one of said sets of frame images, and wherein, after the operation of a specific key, head frame images are successively displayed.

14. A method for processing a moving image displayed on a display unit, comprising the steps of:

reading out said moving images to be processed from a memory device, said moving image comprising a plurality of scene images;

dividing each of said scene images into a plurality of cut images in response to a different image information value between frame images;

dividing each of said cut images into a plurality of p sub-areas, where p is a natural number;

designating representative frame images of said cut images and of said representative p sub-areas;

linking said representative frame images of said respective p sub-areas to respective predetermined keys of an input device; and displaying said representative frame images of said respective p sub-areas on a screen of a display unit in response to an operation of said keys, wherein, in said dividing step of said cut images, numeric values indicative of ratios of the number of frames of the sub-areas to the number of all frames of said cut images are selected by an operator.

15. A method as set forth in claim 14, wherein said representative frame of said sub-area image is a head frame image of each of said p sub-areas.

16. A method as set forth in claim 15, wherein said head frame image is displayed on said display unit in the order of said p sub-areas divided from said cut image.

17. A method as set forth in claim 14, wherein said representative frame image of said cut image and of said sub-area is a reduced image of said frame image.

18. A method as set forth in claim 14, wherein said keys are provided as icons indicative of a keyboard displayed on the screen of said display unit.

19. A method as set forth in claim 14, wherein an editing area and a video material area are provided on the screen of said display unit, said representative frame images of said cut images of the moving image are displayed in said video material area, and the edited moving image is displayed in the form of a tree structure having the representative frame images selected from said video material area in said editing area, so that, when an operator specified one of said representative frame images of said cut image with the operation of the specific key of said input device, the head frame image of said p sub-areas for the designated representative frame image are displayed as overlapped with the designated representative frame image of said cut image in said video material area.

20. A method as set forth in claim 14, wherein, in response to the operation of the specific key of said input device, all of the head frame images of said selected representative frame image are displayed at the same time.

21. A method as set forth in claim 14, wherein, in response to the operation of the specific key of said input device, one of the head frame images of said designated sub-area is displayed.

22. A method as set forth in claim 14, wherein the head frame images of said designated sub-area are displayed only during the operation of the specific key of said input device.

23. An apparatus for processing a moving image displayed on a display unit, comprising:

means for reading out said moving images to be processed from a memory device, said moving image comprising a plurality of scene images;

means for dividing each of said scene images into a plurality of cut images in response to a different image information value between frame images;

means for dividing each of said cut images into a plurality of p sub-areas, where p is a natural number;

means for designating representative frame images of said cut images and of respective p sub-areas;

means for linking said representative frame images of said respective p sub-areas to respective predetermined keys of an input device; and means, in response to an operation of one of said keys, for displaying on a screen of a display unit, a representative frame image of a respective p sub-area linked to the operated one of said keys, wherein an editing area and a video material area are provided on said screen of said display unit, said representative frame images of said cut images of the moving image are displayed in said video material area, and the edited moving image is displayed in the form of a tree structure having the representative frame images selected from said video material area in said editing area, so that, when an operator specified one of said representative frame images of said cut image with the operation of the specific key of said input device, the head frame image of said p sub-areas for the designated representative frame image are displayed as overlapped with the designated representative frame image of said cut image in said video material area.

24. An apparatus as set forth in claim 23, wherein, in said dividing means of said cut images, numeric values indicative of ratios of the number of frames of the sub-areas to the number of all frames of said cut images are selected by an operator.

25. An apparatus as set forth in claim 24, wherein each of said representative frame images of said p sub-areas is a head frame image of each of said p sub-areas.

26. An apparatus as set forth in claim 25, wherein said head frame image is displayed on said display unit in the order of said p sub-areas divided from said cut image.

27. An apparatus as set forth in claim 24 wherein each of said representative frame images of said cut images and of said p sub-areas is a reduced image of a frame image.

28. An apparatus as set forth in claim 24, wherein said keys are provided as icons indicative of a keyboard displayed on said screen of said display unit.

29. An apparatus as set forth in claim 24, wherein, in response to the operation of a specific key of said input device, all of head frame images of a selected representative frame image are displayed at the same time.

30. An apparatus as set forth in claim 24, wherein, in response to the operation of a specific key of said input device, one of head frame images of said designated p sub-areas is displayed.

31. An apparatus as set forth in claim 24, wherein head frame images of said designated p sub-areas are displayed only during operation of a specific key of said input device.

32. An apparatus as set forth in claim 24, wherein, after the operation of a specific key of said input device, head frame images of said designated p sub-areas are successively displayed.

33. A computer program product comprising:

a computer readable medium having computer program code embodied in said medium for causing a computer to process a moving image with use of an input device based on an image displayed on a display unit, said computer program when executed causes the computer to perform the steps of:

displaying images representative of sets of frame images forming said moving image to be processed on said display unit, said moving image comprising a plurality of scene images;

dividing each of said scene images into a plurality of cut images each of which comprises a set of frame images in response to a different image information value between frame images;

dividing each of said cut images into a plurality of p sub-areas, where p is a natural number;

designating representative frame images of respective sub-areas of the sets of frame images as representative images;

linking data of said representative images to respective predetermined keys of an input device; and in response to an operation of one of said keys, displaying on said display unit a representative frame image linked to the operated one of said keys, wherein, in said dividing step, numeric values indicative of ratios of the number of frames of the sub-areas to the number of all frames of said cuts are specified.

* * * * *